United States Patent [19]

Triplett

[11] 4,216,614
[45] Aug. 12, 1980

[54] TECHNIQUE FOR HEATING AN AGRICULTURAL AREA

[75] Inventor: William C. Triplett, Ingleside, Tex.

[73] Assignee: Triad & Associates, Inc., Robstown, Tex.

[21] Appl. No.: 892,649

[22] Filed: Apr. 3, 1978

[51] Int. Cl.² .............................................. A01G 13/06
[52] U.S. Cl. .......................................... 47/2; 126/59.5
[58] Field of Search ...................... 47/2, 9, 48.5, 48.2; 165/45, 46; 126/59.5, 270, 271

[56] References Cited

U.S. PATENT DOCUMENTS

| | | | |
|---|---|---|---|
| 1,375,221 | 4/1921 | Lowe | 47/2 |
| 2,164,011 | 6/1939 | Hilborn | 47/2 |
| 4,117,685 | 10/1978 | Skaife | 47/48.5 |

Primary Examiner—Albert W. Davis
Assistant Examiner—Theophil W. Streule, Jr.
Attorney, Agent, or Firm—G. Turner Moller

[57] ABSTRACT

There is disclosed a system for heating the atmosphere adjacent a ground surface in an agricultural area as well as the process and apparatus for constructing the system. The system comprises an elongate heat distributing structure which extends through the cultivated area and means for circulating a relatively warm fluid through the heat distributing structure. The heat distributing structure includes a plastic shell member disposed in an upwardly concave configuration having a plurality of imperforate wall conduits bonded thereto. The shell member is filled with sand, crushed rock or gravel to provide a heat sink. The top of the plastic shell member is covered with an asphaltic material which acts to close the top of the heat distributing structure and radiate heat to the atmosphere in the cultivated area. The apparatus for laying the heat distributing structure comprises a tracked vehicle having a plow thereon for excavating a shallow furrow in the earth, a reel containing the spooled shell member, a trough on which the shell member runs during unreeling, means for delivering crushed rock into the top of the shell member and means for applying the asphaltic material to the top of the shell member.

10 Claims, 6 Drawing Figures

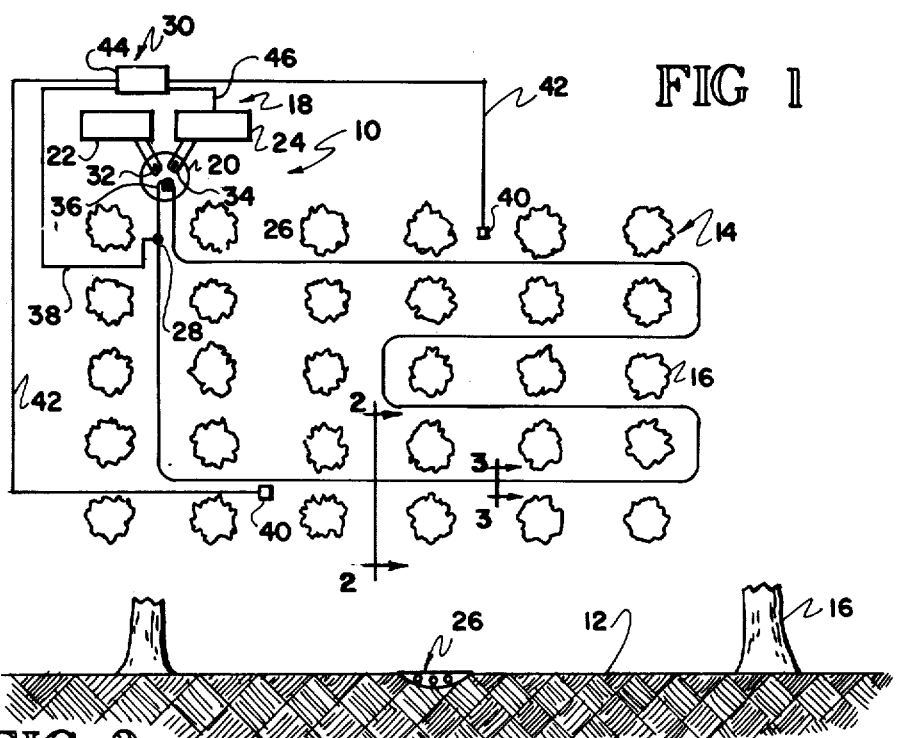
FIG 1
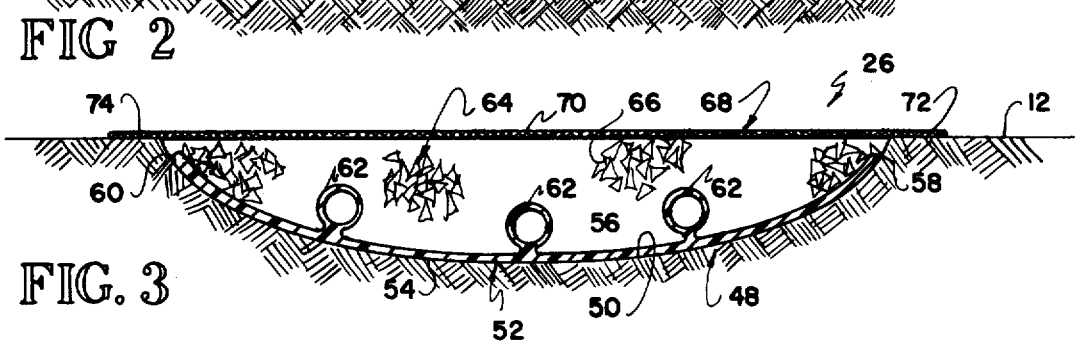
FIG 2
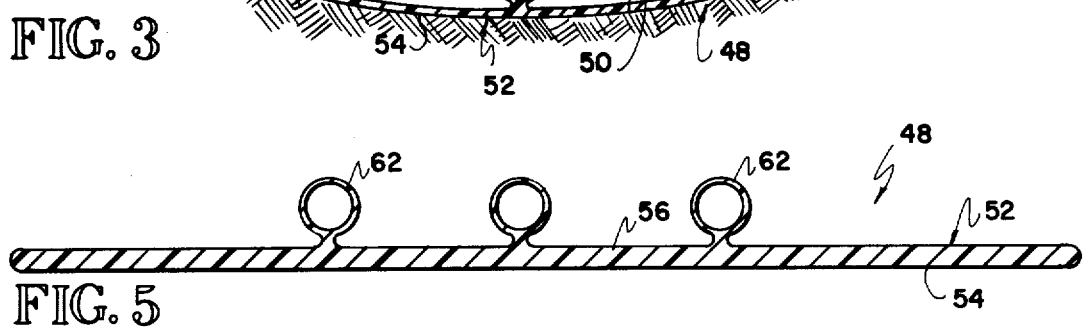
FIG 3
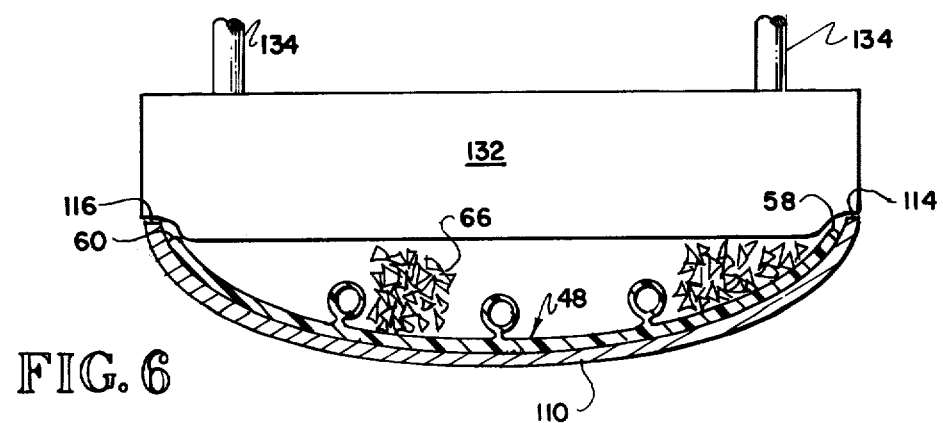
FIG 5
FIG 6

TECHNIQUE FOR HEATING AN AGRICULTURAL AREA

This invention relates to a system for heating the atmosphere close to a ground surface in a cultivated area and methods and apparatus for constructing the heating system.

It is known in the prior art to provide systems for heating orchards, groves and other cultivated areas in order to prevent freeze damage during the winter months. Exemplary disclosures of this type are found in U.S. Pat. Nos. 1,688,802; 1,758,941; 2,003,520; 2,102,989; 3,521,699 and 3,863,710. A similar disclosure for heating a paved surface in order to remove snow and ice is found in U.S. Pat. No. 3,758,748. Another similar disclosure which is apparently aimed at draining and heating a grass surface in a sport arena is found in German Pat. No. 1,945,067.

There are a number of problems associated with the above prior art devices. First, many of these devices incorporate a multiplicity of heat distributing members which extend substantially above ground level and are an impediment to the travel of vehicles through the cultivated area as may be required for planting, applying fertilizer, spraying weed control or pest control materials, harvesting and the like. Another difficulty with these prior art devices which have an above ground heat distributors is that they include a number of moving parts which are necessarily expensive, require maintenance and periodic replacement, and the like. Those systems which merely incorporate conduits buried in the ground for circulating a hot fluid provide an inefficient technique for radiating heat to the atmosphere because far more than half of the heat distributed by such systems is absorbed by the ground.

This invention comprises a system for heating the atmosphere close to a ground surface in a cultivated area and an apparatus and method for constructing an important part of the system.

The system comprises an elongate heat distributing structure extending through the cultivated area and providing an inlet and an outlet, and means for supplying relatively warm fluid to the inlet and for receiving relatively cool fluid from the outlet.

The elongate heat distributing structure includes a pliable plastic shell member which is disposed in a furrow in the ground and is upwardly concave. The concave surface of the shell member may be light colored or silvered in order to reflect radiated heat. Bonded to the shell member are at least one and preferably a plurality of elongate impermeable wall conduits. The conduits are connected to transmit heated fluid throughout the cultivated area.

A heat absorbing material which is preferably a multiplicity of pieces of hard earth material, such as sand, gravel, crushed rock or the like, is disposed in the shell member in heat exchange relation with the conduits. The heat absorbing material accordingly acts as a heat sink providing substantial heat capacity. The upper edges of the shell member are spanned and closed by an asphaltic covering. Because the asphaltic covering is dark in color, it comprises an excellent absorber of radiated energy from the heat absorbing material and an excellent radiator of heat energy to the atmosphere. In addition, the asphaltic covering captivates the heat absorbing material in the shell member. Because the asphaltic covering is substantially at ground level and is capable of supporting vehicular traffic, there is no obstruction of the cultivated area by the system of this invention.

In order to install or lay the heat distributing structure, there is provided a laying vehicle having a plow member thereon for excavating a furrow in the earth during movement of the vehicle in the cultivated area. A spooled or reeled length of the shell member is unwound and is passed along a trough member extending generally in the direction of vehicular travel. The trough member acts to support the shell member in its upwardly concave configuration. The crushed rock or other heat absorbing material is delivered from a hopper into the shell member. A strike-off blade acts to prevent over filling of the shell member. At about the time the shell member discharges from the trough, asphalt is sprayed or otherwise applied to the top of the shell member. Either immediately or after a delay to allow the asphaltic material to cool somewhat, the covering is rolled to assure bonding of the asphaltic material with the crushed rock and the shell member.

It is accordingly an object of this invention to provide an improved system for heating the atmosphere close to a ground surface in a cultivated area.

Another object of this invention is to provide an improved method and apparatus for constructing a heat distributing structure in a cultivated area.

Other objects and a fuller understanding of the invention may be had by reference to the following description taken in conjunction with the accompanying drawings and claims.

IN THE DRAWINGS:

FIG. 1 is a schematic plan view of the heating system of this invention;

FIG. 2 is a vertical cross-section of the system of FIG. 1 taken substantially along line 2—2 thereof as viewed in the direction indicated by the arrows;

FIG. 3 is an enlarged vertical cross-sectional view of the heat distributing system of this invention as taken along line 3—3 of FIG. 1 as viewed in the direction indicated by the arrows;

FIG. 5 is an enlarged transverse cross-sectional view of the shell member incorporated in the heat distributing structure of this invention as taken along line 5—5 of FIG. 4; and FIG. 6 is an enlarged transverse cross-sectional view of the trough supporting member of the laying equipment as taken along line 6—6 of FIG. 4.

Figure 4:
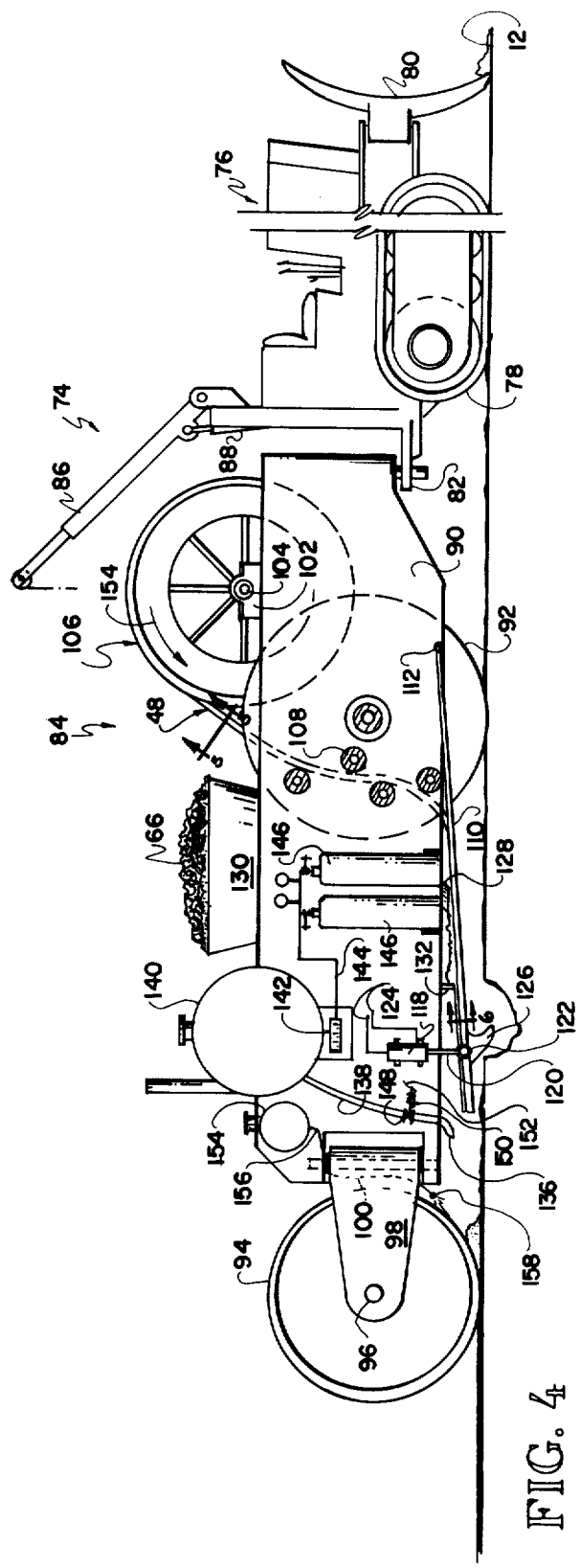
FIG. 4 is a side view, partly in section and partly schematic, of equipment used in the construction of the heating system of FIGS. 1 and 2.

Referring to FIGS. 1 and 2, there is illustrated a system 10 for heating the atmosphere close to a ground surface 12 in a cultivated area 14 which is illustrated as comprising a grove of bearing trees or bushes 16 which may be nut or fruit bearing trees, coffee bearing bushes, row crops or the like.

The heating system 10 comprises a fluid heating and storage apparatus 18 comprising a reservoir 20, one or more fluid heaters 22, 24 for heating fluid in the reservoir 20, an elongate heat distributing structure 26, a pump 28 for circulating the fluid through the structure 26 and a system 30 for controlling the fluid heating and storing apparatus 18.

The reservoir 20 preferably comprises a relative large insulated vessel for storing a significant quantity of heated material which may be a solid such as sodium sulphate but which is desirably a liquid such as water.

The fluid heaters may be of any suitable type but desirably include a solar heater 22 arranged to heat water in the reservoir 20 either indirectly through a heat exchanger 32 or directly by circulating water from the reservoir 20 into the heater 22. The heater 24 is desirably a fueled heater which may utilize electricity or a fossil fuel or geothermal liquid for generating heat and either heating the fluid in the reservoir 20 indirectly through a heat exchanger 34 as illustrated or directly by circulating water from the reservoir 20 through the fluid heater 24.

As more fully explained hereinafter, the heat distributing structure 26 includes at least one and preferably a plurality of conduits for receiving relatively warm water from the reservoir 20, circulating the relatively warm water through the cultivated area 14 to heat the atmosphere close to the ground surface 12 and for delivering relatively cool water back into the reservoir 20 for reheating. Reheating of the water in the reservoir 20 may be conducted indirectly through a heat exchanger 36 or may be conducted directly by dumping relatively cool water into the reservoir 20 and removing relatively warm water therefrom.

The pump 28 acts to circulate water through the distribution structure 26 and may be of any suitable type. Conveniently, the pump 28 is of the electrically driven type and is energized through a wire 38 connected to the control system 30. Although the system 10 can be started manually, it is preferred to provide one or more temperature sensors 40 disposed in the cultivated area 14 and connected by suitable leads 42 to a control circuit 44 for automatically starting the system 10 in response to a predetermined low temperature. The control circuit 44 is connected through a lead 46 to the fueled heater 24 for energizing the same.

At the approach of winter, the solar heater 22 is desirably manually energized to commence heating water in the reservoir 20. The auxillary heater 24 is energized at or near the onset of crop damaging temperatures either automatically or manually when weather predictions indicate that a freeze is imminent.

With a manual control system, the operator energizes the pump 28 at the approach of crop damaging temperatures to circulate warm water through the heat distributing structure 26 to radiate heat into the cultivated area 12. With an automatic control system, the temperature sensors 40 detect the onset of crop damaging temperatures and, operating through the control circuit 44, act to energize the pump 28.

Referring to FIG. 3, the heat distribution structure 26 comprises an elongate shell member 48 disposed in a furrow 50. The shell member 48 comprises a backing member 52 having an exterior surface 54 which may be insulated if desired, engaged with the ground in the furrow 50, and an interior surface 56 which is desirably silvered or of a light color to reflect radiant energy. The shell member 48 is supported by the furrow 50 in an upwardly concave configuration having generally parallel edges 58, 60 disposed adjacent the ground surface 12.

Bonded to the shell member 48 and preferably to the inner surface 56 thereof are at least one and preferably a plurality of elongate conduits 62 extending throughout the length of the heat distributing structure 26. The conduits 62 desirably have imperforate walls to confine the movement of heated water through the conduits 62. It will accordingly be apparent that the shell member 48 can be extruded as a one-piece member from an organic polymeric material such as polyethylene, polyvinyl chloride and the like with conventional extrusion equipment.

The upwardly concave trough provided by the shell member 48 is filled with a heat absorbing material 64 preferably comprising a multiplicity of pieces 66 of hard earth materials, such as sand, crushed rock, gravel and the like. The heat absorbing pieces 66 accordingly surround and touch the conduits 62 and are otherwise in heat transfering relation therewith.

Spanning the side edges 58, 60 of the shell member 48 in a generally horizontal plane is an asphaltic closure 68 which is black or other dark color. The closure 68 is preferably impermeable and preferably comprises a section 70 between the side edges 58, 60 and a pair of sections 72, 74 laterally outward from the side edges 58, 60. The section 70 accordingly comprises a heat absorbing and radiating unit which acts to absorb thermal energy from the pieces 66 and radiate thermal energy into the atmosphere close to the ground 12. It will be evident that the closure 68 is generally flush with the ground surface 12. Because the pieces 66 provide a load bearing capability, it will be evident that the heat distributing structure 26 may be driven across by a vehicle and consequently does not constitute an impediment to normal agricultural operations in the cultivated area 14.

Referring to FIGS. 4–6, there is disclosed a vehicle 74 for laying the heat distributing structure 26. The vehicle 74 comprises a powered tractor unit 76 having ground engaging means 78 such as wheels or endless tracks for propelling the vehicle 74 in a predetermined path through the cultivated area 14. The tractor unit 76 desirably comprises a ground clearing blade 80 for leveling the area in which the structure 26 is to be laid, a trailer hitch 82 for connection to a trailer laying unit 84 and a boom 86 elevated by a hydraulic motor 88 for raising and lowering the trailer unit 84 from connection with the trailer hitch 82 and for delivering a spool of the shell member 48 onto the trailer 84.

The trailer laying unit 84 comprises a frame 90 having a pair of ground engaging wheels 92 independently mounted thereon and desirably comprises a rearwardly disposed roller or plurality of spaced wheels 94. As will be explained more fully hereinafter, it may be desirable to compact the asphaltic covering 68 immediately after application. In this circumstance, the ground engaging device 94 is desirably a roller of considerable transverse extent. In the event it is not desired to immediately compact the asphaltic covering 68, the ground engaging means 94 comprises a plurality of wheels spaced apart sufficiently to straddle the heat distributing structure 26. The wheels or roller 94 is mounted by an axle 96 on a bracket or clevis 98 which is in turn supported by a vertical pin 100 in load supporting relation with the frame 90.

Positioned on the frame 90 adjacent the forward end thereof is a bearing block 102 which is designed to temporarily receive a spindle 104 of a reel 106 carrying the shell member 48 in a spooled condition. As will be apparent, the boom 86 allows easy loading and unloading of full and empty reels.

As the spooled shell member 48 is unwound from the reel 106, it passes between a plurality of guide rollers 108 which act to direct the shell member 48 onto a trough shaped member 110 pivotally connected to the frame 90 by a pin 112. As shown best in FIG. 6, the trough 110 is sized to receive the shell member 48 so that the edges 58, 60 thereof are at a level coplanar with or below the side edges 114, 116 of the trough 110.

Moving the trough 110 from a downwardly inclined operative position to a generally horizontal storage position are one or more reciprocating hydraulic motors 118 having a moveable rod member 120 pivotally connected by a pin 122 to the trough 110. Suitable hydraulic lines 124 connect between the motor 118 and a suitable control mechanism (not shown) for manipulating the motor 118 and consequently manipulating the trough 110.

Carried by the trough 110 and extending downwardly toward the ground surface 12 is a plow blade 126 which acts, in the lowered position of the trough 110, to excavate the furrow 50. It will accordingly be seen that manipulation of the motor 118 and forward movement of the powered tractor unit 76 acts to excavate the furrow or trench 50.

At a location downstream of initial contact between the shell member 48 and the trough 110 is a valved discharge spout 128 leading from a hopper 130 filled with the pieces 66 of heat absorbing material. A suitable valve (not shown) is operatively associated with the spout 128 and a suitable remote operator (not shown) is provided on the tractor unit 76 adjacent the operator station for selectively opening and closing the spout 128. It will be apparent that the spout 128, the valve and operator therefor, and the hopper 130 comprise means for delivering the heat absorbing material 64 into the longitudinally extending transversely concave receptacle afforded by the shell member 48 as supported by the trough 110.

Downstream of the spout 128 is a strike-off blade 132 which may be rigid with the trough 110 but which is desirably vertically adjustable in any suitable fashion, as by the provision of actuating arms 134 operatively associated with a reciprocating hydraulic motor (not shown). It will be evident that the strike-off blade 132 acts to level the heat absorbing pieces 66 in the shell member 32 downstream of the blade 132. It will also be evident that the strike-off blade 132 acts to assure that the shell member 48 is filled with the heat absorbing pieces 66 so long as an excess of material is provided upstream of the blade 132.

Located adjacent the end of the trough 110 and preferably at a location where the shell member 48 has been deposited in the furrow or trench 50 is an asphalt applicator 136. The applicator 136 may be of any suitable type but is desirably a spray head for spraying liquid or flowable asphalt onto the open top of the shell member 48 which has been filled with the heat absorbing pieces 66. The applicator 136 is connected by a suitable conduit 138 to an asphalt reservoir 140 heated by a burner 142 fueled through a conduit 144 leading to one or more fuel tanks 146. A valve 148 is positioned in the conduit 138 and has a solenoid operator 150 connected to an electric lead 152. A switch (not shown) located at the operator's station in the tractor unit 76 is used to selectively energize the solenoid 150 through the lead 152 to deliver asphalt through the conduit 138. Suitable means (not shown) are used to heat the conduit 138 to maintain asphalt therein in a liquid condition to avoid plugging the conduit 138.

The trailer 84 also carries a water tank 154, conduit 156 and spray head 158 for delivering water onto the roller 94 or onto the freshly laid asphalt covering 68 in order to prevent the asphalt from sticking to and being picked up by the roller 94.

In use, the boom 86 and hydraulic motor 88 are used to lift a loaded reel 106 so that the spindle 104 thereof is received in the bearing block 102. The free end of the shell member 48 is threaded through the guide rollers 108 onto the trough 110. Suitable means (not shown) may be provided to drive the reel 106 in an unspooling direction or the shell member 48 may be manually pulled along the trough 110 until a sufficient length thereof is unspooled so that the roller 94 can move thereon. With the end of the shell member 48 under the roller 94, forward movement of the tractor unit 76 causes the reel 106 to rotate in the direction indicated by the arrow 154 to unspool the shell member 48 from the reel 106.

The hydraulic motor 118 is energized through the lines 124 to lower the trough 110 so that the plow member 126 excavates the furrow 50 during the forward movement of the tractor unit 76. The valve (not shown) on the spout 128 is opened to allow the heat absorbing pieces 66 to gravitate into the upwardly concave shell member 48. Continued forward movement of the tractor unit 76 causes the strikeoff blade 132 to level off the pieces 66. As the shell member 48 exits from the trough 110, the asphaltic material is applied through the spray head 136 to produce the asphalt closure illustrated in FIG. 3. The roller 94 then compacts the asphaltic closure 68, the heat absorbing pieces 66 and the excavated earth thrown up by the plow 126 during continued forward movement of the tractor 76.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed.

I claim:

1. A system for heating the atmosphere close to a ground surface in a cultivated area, comprising
    an elongate heat distributing structure extending through the cultivated area, comprising
        an elongate upwardly concave shell member disposed in a furrow in the ground and having a pair of spaced generally parallel edges;
        at least one elongate conduit received in the shell member and providing an inlet and outlet;
        heat absorbing material in the shell member surrounding the conduit; and
        means extending at least partially across the spaced shell edges for captivating the heat absorbing material and having a section exposed to the atmosphere for radiating heat from the material to the atmosphere; and
    means for supplying relatively warm fluid to the inlet and for receiving relatively cool fluid from the outlet.

2. The system of claim 1 wherein the conduit comprises a substantially impermeable wall.

3. The system of claim 1 wherein the captivating means comprises a dark colored material.

4. The system of claim 3 wherein the captivating means comprises asphalt.

5. The system of claim 3 wherein the captivating means comprises means spanning and closing the spaced shell edges.

6. The system of claim 1 wherein the conduit is integral with the shell member.

7. The system of claim 5 wherein the shell member is of organic polymeric material and is bodily flexible.

8. The system of claim 7 wherein the concave surface of the shell member is of a color substantially lighter than the captivating means.

9. The system of claim 7 wherein the elongate heat distributing structure comprises a multiplicity of conduits integral with the shell member.

10. The system of claim 1 wherein the heat absorbing material comprises a multiplicity of pieces of hard earth material.

* * * * *